June 26, 1962

G. H. TAUSCH ET AL 3,040,813

PLURAL COMPLETION OF WELLS

Filed May 5, 1958

INVENTORS.
GILBERT H. TAUSCH,
CHARLES B. CORLEY, JR.,
BY  JOHN W. KENNEDAY,

*ATTORNEY*

June 26, 1962

G. H. TAUSCH ET AL 3,040,813

PLURAL COMPLETION OF WELLS

Filed May 5, 1958

INVENTORS.
GILBERT H. TAUSCH,
CHARLES B. CORLEY, JR.,
JOHN W. KENNEDAY,

BY

ATTORNEY.

INVENTORS.
GILBERT H. TAUSCH,
CHARLES B. CORLEY, JR.,
BY   JOHN W. KENNEDAY,

ATTORNEY.

June 26, 1962

G. H. TAUSCH ET AL 3,040,813

PLURAL COMPLETION OF WELLS

Filed May 5, 1958

INVENTORS.
GILBERT H. TAUSCH,
CHARLES B. CORLEY, JR.,
BY   JOHN W. KENNEDAY,

ATTORNEY.

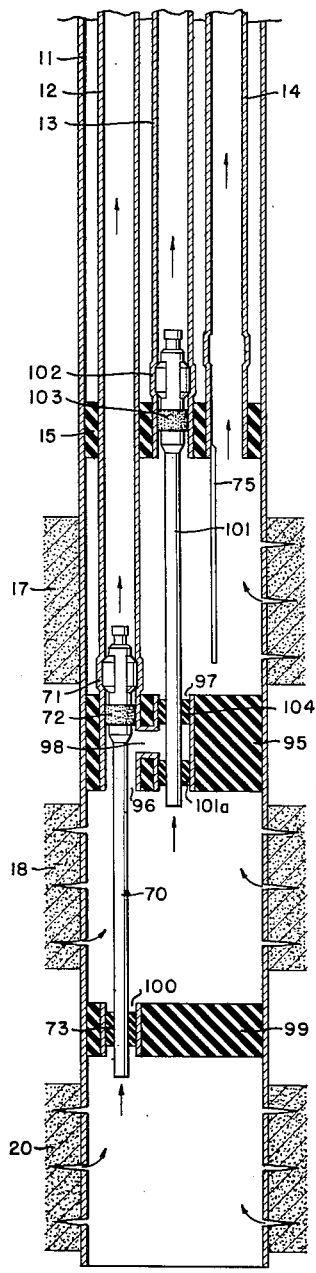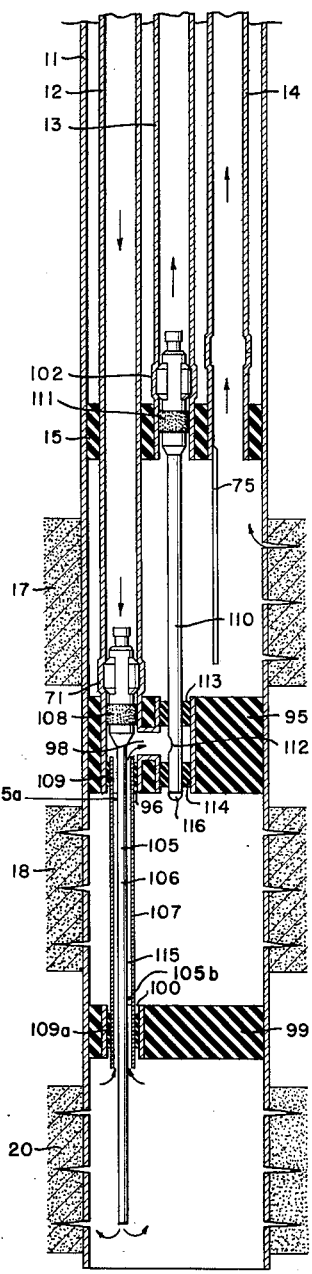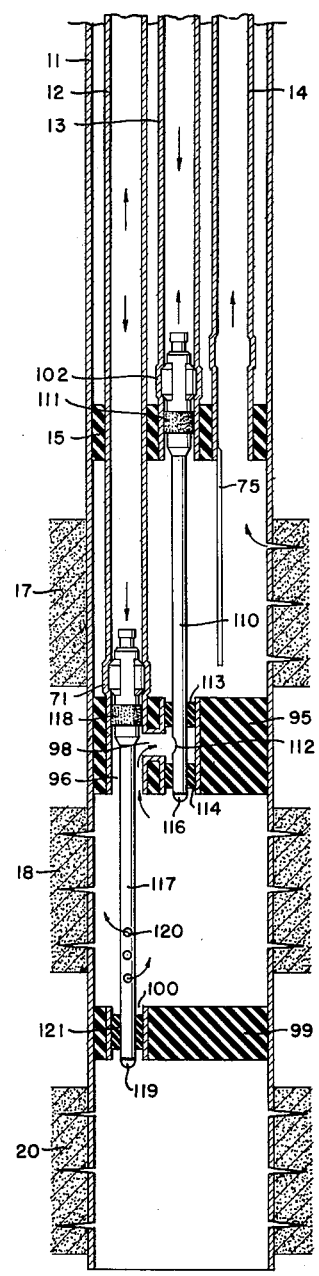

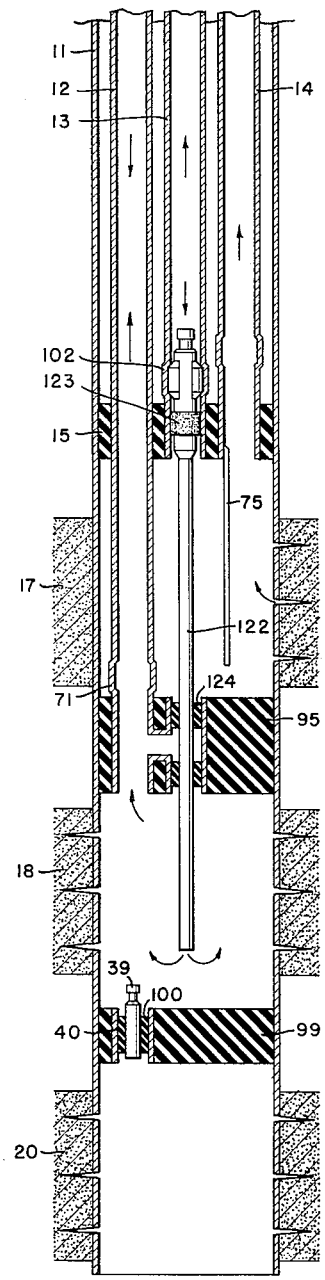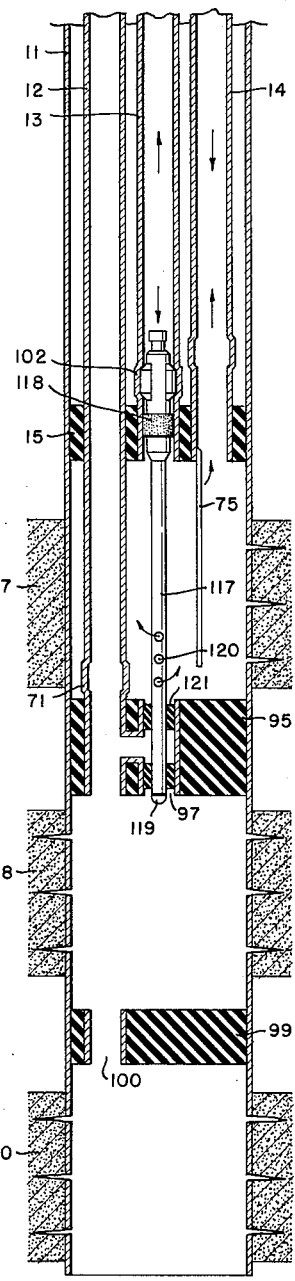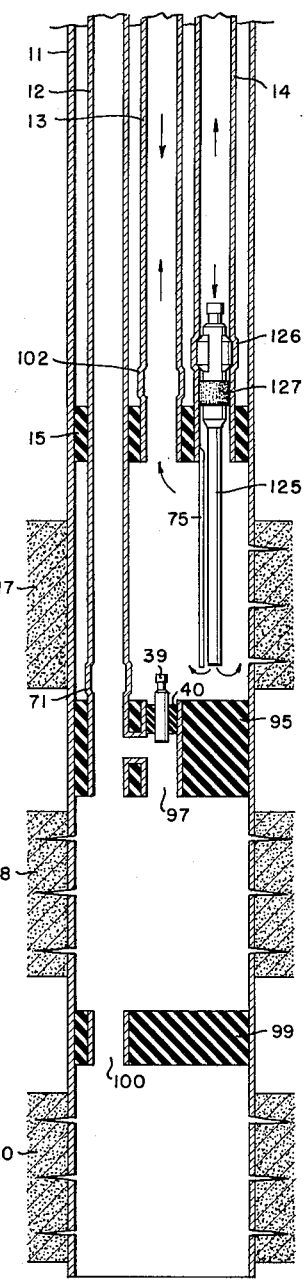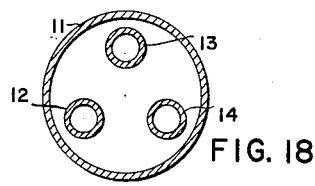

United States Patent Office 3,040,813
Patented June 26, 1962

3,040,813
PLURAL COMPLETION OF WELLS
Gilbert H. Tausch, Charles B. Corley, Jr., and John W. Kenneday, Houston, Tex., assignors, by mesne assignments, to Jersey Production Research Company, Tulsa, Okla., a corporation of Delaware
Filed May 5, 1958, Ser. No. 732,873
7 Claims. (Cl. 166—189)

The present invention is directed to completion of a well in a plurality of hydrocarbon productive zones. More particularly, the invention is concerned with method and apparatus for completing a well in a plurality of hydrocarbon productive zones in which each of the zones may be produced and separately reworked. In its more specific aspects, the invention is concerned with completion and working over of wells in a plurality of hydrocarbon productive zones in which fluids are flowable through a plurality of pipe strings simultaneously.

The present invention will be further described with reference to the drawing in which:

FIG. 1 is a similar view to FIG. 1a illustrating simultaneous and separate production from the three perforated zones of FIG. 1a;

FIG. 12 is a further modification of the embodiment of FIG. 1 illustrating simultaneous and separate production from the three zones with two of the three tubing strings arranged above the three zones;

FIG. 13 illustrates the workover and servicing of the lower zone employing the embodiment of the tubings of FIG. 12;

FIG. 14 illustrates the workover and servicing of the intermediate zone employing the embodiment of the tubings of FIG. 12;

FIG. 15 illustrates a modification of FIG. 14 for working over and servicing the intermediate zone;

FIG. 16 illustrates the working over and servicing of the upper zone employing the embodiment of the tubings of FIG. 12;

FIG. 17 is a modification of FIG. 16 for working over and servicing the upper zone; and FIG. 18 is a cross-sectional view taken along the lines 18—18 of FIG. 1a.

Figure 1A:
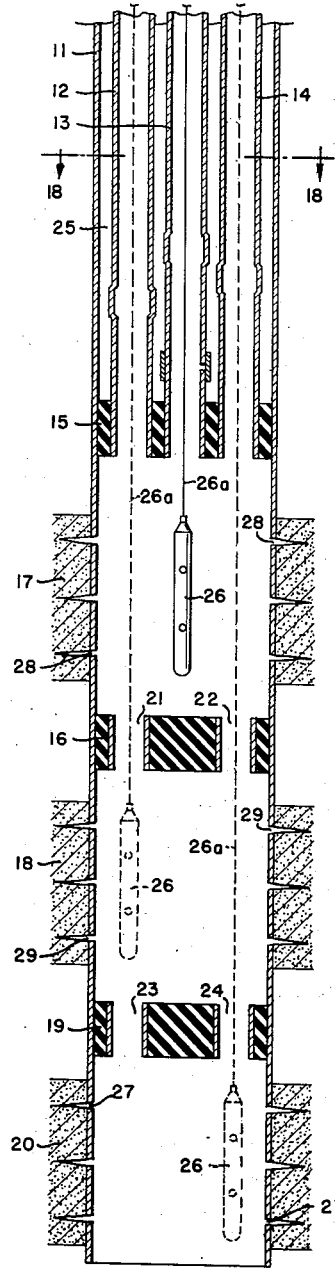
FIG. 1a is a partial sectional view in elevation of a well with three eccentric pipe strings arranged therein above three vertically spaced apart zones illustrating perforation in said vertically spaced apart zones.

Referring now to the drawing, in which identical numerals will be employed to designate identical parts, and particularly to FIG. 1a, numeral 11 designates a well-casing which is cemented in place in a well bore and which is provided with three substantially parallel eccentrically placed tubing strings 12, 13, and 14, having their lower ends arranged in a packer 15. A second packer 16 is spaced vertically below the packer 15 and separates an upper zone 17 from an intermediate zone 18. A third packer 19 spaced vertically below the packer 16 separates the intermediate zone 18 from a lower zone 20.

It will be noted that packers 16 and 19 are provided with dual bores 21 and 22 and 23 and 24, respectively.

The tubing strings 12, 13 and 14 are run into the well casing 11 and positioned as shown with their lower ends above the zones 17, 18 and 20. It is to be emphasized that zones 17, 18 and 20 are illustrative only and comprise a plurality of separate zones, horizons, strata, sands, formations, and the like, separated from each other by non-productive zones.

After the tubing strings 12, 13 and 14 have been placed and the packer 15 seated to close the tubing-casing annulus 25, the well will be in condition for perforation as will be described subsequently. It is to be remembered, however, that the packers 16 and 19 have been placed prior to the running in of the tubing strings 12, 13 and 14, and the seating of the packer 15.

To perforate the lower zone 20, a perforator 26 may suitably be run on a wire line, such as 26a, and lowered through the tubing 14 and through the bores 22 and 24 adjacent the zone 20 and there operated to form perforations 27 in the casing, cement surrounding the casing (not shown), and the formation or zone 20. The perforator 26 may be a bullet or shaped charged type perforator or a mechanical or a chemical type perforator. Preferably, a shaped charge perforator is employed.

After the perforator 26 has been employed in the zone 20, it may be withdrawn through the bores 24 and 22 into tubing 14, and the perforator may be lowered through the tubing 13 on wire line 26a to zone 17 and there operated to form the perforations 28. Thereafter, the perforator 26 may be lowered on wire line 26a through the tubing 12 and through the bore 21 into the zone 18 and operated to form the perforations 29 in the zone 18.

It is to be understood, of course, that the perforator 26 may be lowered through one of the tubing strings and operated sequentially in the three zones to perforate the three zones, the separate lowering and operating of the perforator being described to perforate the casing 11 with the desired number of shots.

After the casing has been perforated as has been described with reference to FIG. 1a, the well may be produced separately and simultaneously from three zones as will be described more fully with respect to FIG. 1. In order to obtain simultaneous and separate production from the three zones, a tubular conduit 30 is lowered through the tubing string 12 and positioned on a supporting means 31, which may suitably be a landing nipple, and sealed therein with sealing means 32, the upper end of the tubular conduit 30 being positioned in the lower end of the tubing 12. The tubular conduit 30 is also positioned sealingly with sealing means 33 in the packer 16 and is also positioned sealingly with the sealing means 34 in the packer 19, closing the bores 21 and 23. A second tubular conduit 35 is run in through the tubing 14 suitably on wire line 26a and is positioned with its upper end in a supporting means such as a landing nipple 36 and sealed therein with sealing means 37. The lower end of the tubular conduit 35 is positioned in the packing means 16 with the sealing means 38 closing the bore 22. Prior to running in the tubular conduit 35 a wire line retrievable plug 39 is run in through the bore 22 and into the bore 24 to close the bore 24 with the sealing means 40, as described. A seal may also be effected by extending the length of conduit 36, closing its lower end, and sealing the enclosed lower end in the second bore of packer 19. Ports may be provided in the so modified conduit 35 opposite zone 18 for production therefrom.

Figure 1:
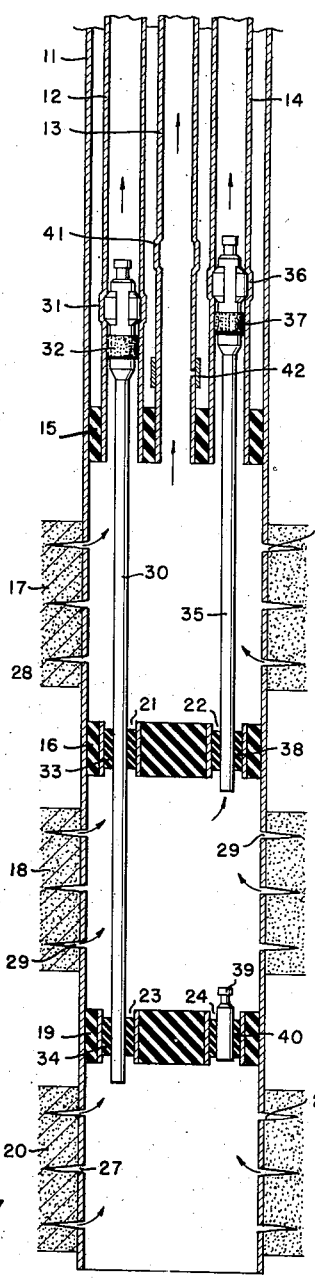

By virtue of the arrangement in FIG. 1, it is now possible to produce separately and simultaneously from the zones 17, 18 and 20, flow from the zone 17 being upwardly through the tubing string 13, flow from the zone 18 being upwardly through the conduit 35 and the tubing 14, while flow from the zone 20 is upwardly through the conduit 30 and the tubing 12.

It is to be noted that tubing string 13 is provided with a supporting means 41, which is similar to supporting means 31 and 36 and is also provided with a wire line operated valved port 42, which is well known to the art. The wire line operated valved port 42 allows communication into the annulus 25 by opening the valved port 42.

Figure 2:
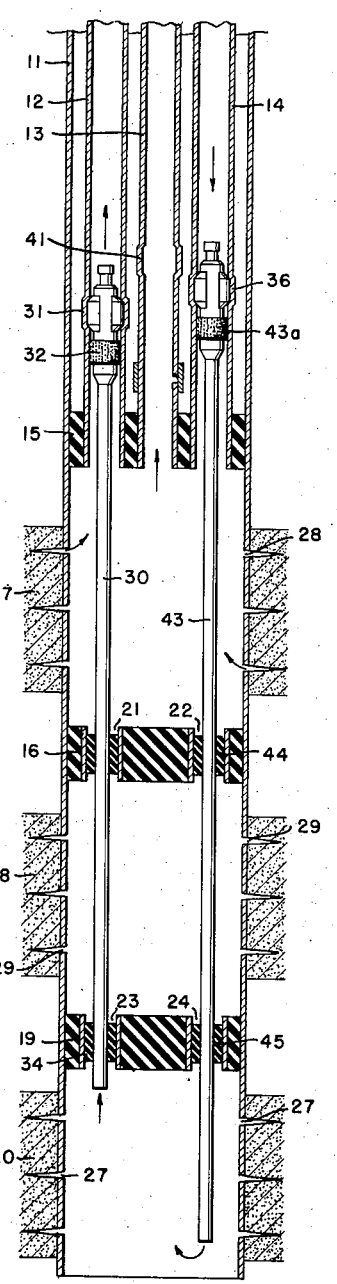
FIG. 2 is a similar view to the preceding figures illustrating workover and servicing of the lower zone.

Referring now to FIG. 2, when it is desired to rework the zone 20, the tubular conduit 35 is replaced by a tubular conduit 43 provided with a sealing means 43a, which is of sufficient length to extend through the bores 22 and 24 and being provided with sealing means 44 and 45 to close the bores 22 and 24. Sealing means 44 may be omitted if desired since seal 45 closes off zone 20 and seal 43a prevents flow into the tubing 14 from zone 17 or 20. By virtue of this arrangement, it is now possible to continue production from the zone 17 up through the tubing string 13 and it is also possible to conduct an operation in the zone 20, such as flowing fluid into the zone 20 down through the tubing 14 and removing fluid from the zone 20 up through the tubing 12 as shown by the arrows, the tubular conduits 43 and 30 effectively conducting the fluid from the zone 20 through the zones 17 and 18. It is to be understood that the fluid may include fluid cement or a treating reagent and when the fluid is fluid cement the perforations 27 may be sealed and then the zone 20 may be reperforated by again lowering a perforator such as 26 on wire line 26a into the zone 20 and operating same to form perforations in the zone 20 in the region of the sealed perforations or spaced vertically therefrom.

Figure 3:
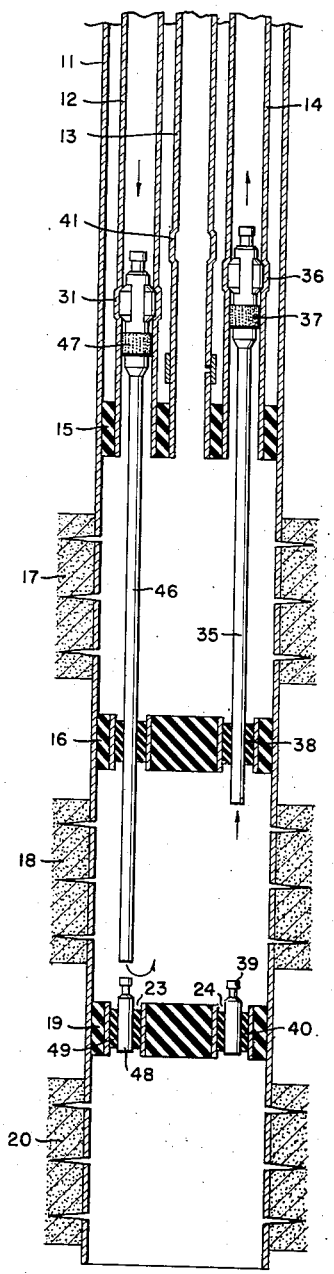
FIG. 3 is a partial sectional view in elevation illustrating workover and servicing of the intermediate zone.

Referring now to FIG. 3, when it is desired to work over the zone 18, such as to wash sand therefrom, the tubular conduit 30 is replaced by a tubular conduit 46, whose length is such that it terminates above the packer 19, the tubular conduit 46 being positioned like the tubular conduit 30 on the supporting means 31 and sealed therein with a sealing means 47. Prior to running in the tubular conduit 46 the bore 23 of the packer 19 is suitably closed by means of a wire line retrievable plug 48 provided with a sealing means 49. Alternatively, the plug 48 may be integral with conduit 46. Thereafter, a washing fluid or a treating reagent, such as has been described, is flowed down the tubing 12 and through the tubular conduit 46 into the intermediate zone between the packers 16 and 19 and then fluid is returned up the tubular conduit 35 into tubing string 14 to the earth's surface.

When it is desired to rework the upper zone or to perform an operation therein the tubular conduits 30 and 35 are replaced by tubular conduits 50 and 51, which are positioned on the supporting means 31 and 36 and sealed therein with sealing means 52 and 53. It is to be noted that tubular conduits 50 and 51 have closed lower ends 54 and 55, respectively, and are provided with ports 56 and 57. In effect, the tubular conduits 50 and 51 provide means for closing the bores 21 and 22 and also provide means for circulating fluid down the tubing string 12 outwardly through ports 56 into the tubular conduit 51 through port 57 and upwardly through tubing string 14 to the earth's surface. Alternatively, fluid may flow upwardly to the earth's surface through the tubing string 13 or through the tubing string 14 or through both tubing strings as may be desired. It is to be noted that the zones 18 and 20 are effectively closed by closing of the bores 21 and 22 in the packer 16.

Figure 5:
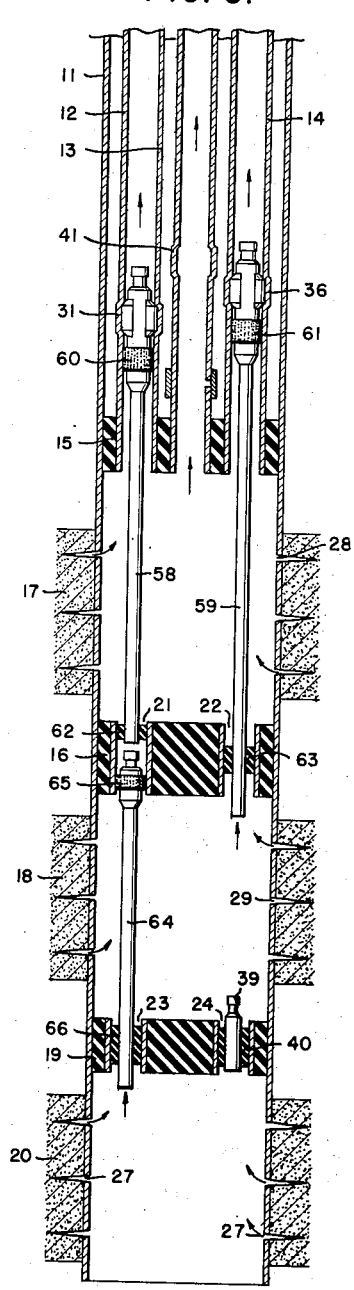
FIG. 5 is a modification of the embodiment of FIG. 1 illustrating simultaneous and separate production from the three zones.
Figure 6:
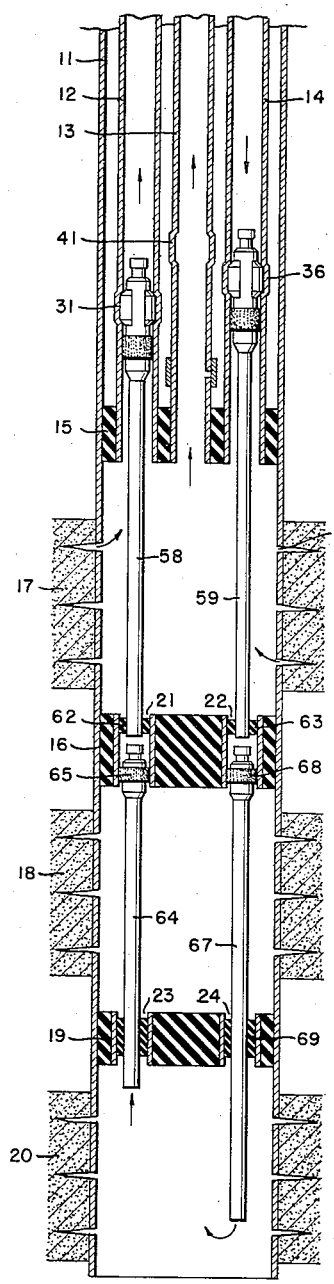
FIG. 6 is a modification of the embodiment of FIG. 2 illustrating workover and servicing of the lower zone.

Referring now to FIG. 5, a modification of the embodiments of FIGS. 1 and 2 is presented. In this embodiment of FIGS. 5 and 6, tubular conduits 58 and 59 are arranged on the supporting means 31 and 36 and sealed therein with sealing means 60 and 61. The tubular conduit 58 is provided with a sealing means 62 which sealingly engages in the bore 21 of the packer 16 and the tubular conduit 59 is provided with a sealing means 63 which sealingly engages in the bore 22 of the packer 16.

Prior to running in the tubular conduits 58 and 59 on a wire line, wire line retrievable plug 39 with sealing means 40 is positioned in the bore 24 and a tubular member 64 provided with a sealing means 65 on its upper end is lowered on a wire line and positioned in the bore 21 below the lower end of the tubular conduit 58, the tubular conduit 64 being provided with a sealing means 66 on its lower end for sealingly engaging in the bore 23 of the packing means 19.

It will be clear from the foregoing description of FIG. 5 that it is now possible to produce separately and simultaneously from the zones 17, 18 and 20, the production from the zone 20 being through the conduits 64 and 58 and through tubing 12, while production from the zone 17 is upwardly through tubing 13 and production from the zone 18 is up through tubular conduit 59 and through tubing 14. Also it is possible to work over and service the several zones.

When it is desired to work over the zone 20 to perform an operation therein such as removing cement or other treating reagent or introducing treating reagent therein, a tubular conduit 67 would be run in on a wire line and positioned in the bore 22 and sealingly engaged therein with sealing means 68 and also sealingly engaged in the bore 24 with sealing means 69, the wire line plug 39 having been removed and thereafter the tubular conduit 59 being placed on the supporting means 31, as has been described previously.

This allows flow to proceed down the tubing string 14 through tubular conduits 59 and 67 and out the end thereof in the zone 20 and then upwardly through the tubular conduits 64 and 58 and up the tubing string 12. In the meanwhile, production may be continued from the zone 17 upwardly through tubing string 13.

Figure 4:
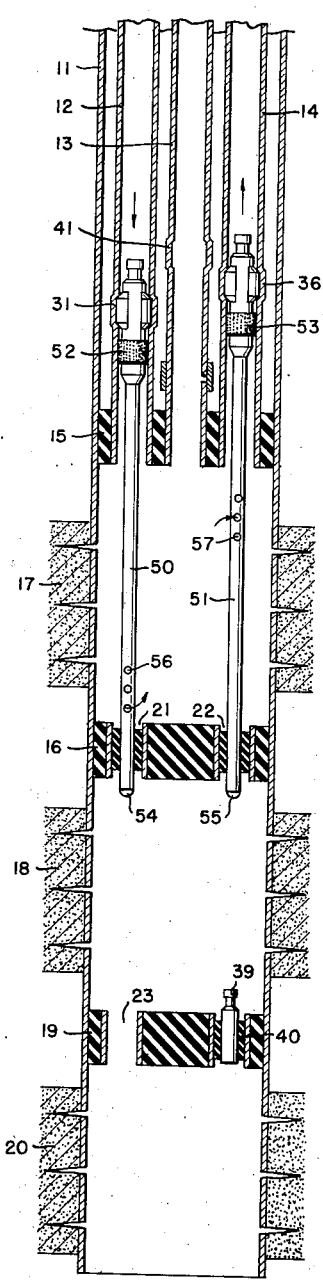
FIG. 4 is a similar view to FIG. 3 illustrating workover and servicing of the upper zone.

Workover operations, with respect to the embodiment of FIG. 5, for intermediate zone 18 and upper zone 17 may be accomplished in a manner similar to that shown and described with respect to FIGS. 3 and 4.

Referring now to FIGS. 7 to 11, a mode and embodiment of the present invention is described in which the tubing string 14 is positioned with its lower end above the zone 17, while the tubing strings 12 and 13 are positioned with their lower ends above the zone 18. The packer 15 is arranged above the zone 17, while the packer 16a is arranged between the upper zone 17 and the intermediate zone 18, and the packer 19a is arranged between the intermediate zone 18 and the lower zone 20. In this particular embodiment the wire line plug 39 with sealing means 40 may be used to close the bore 24 of the packing means 19a and a tubular conduit 70 is arranged on a suitable landing nipple or supporting means 71 and sealingly engaged therein with sealing means 72. Also, sealing means 73 engages with the bore 23 of packing means 19a and closes same.

It is to be noted that the tubing string 14 is in this particular series of figures is provided with a valved port 74 arranged below the supporting means 36. Also, it is to be noted that the packer 15 and the tubing 14 has depending therefrom a suitable guide means 75 for positioning a gun perforator in the zone 17 such that the tubing strings 12 and 13 will not be perforated when the zone 17 is perforated as has been described with respect to FIG. 1. A description of the guide means 75 will be found in the patent to Bielstein, U.S. 2,781,098, issued February 12, 1957.

Figure 7:
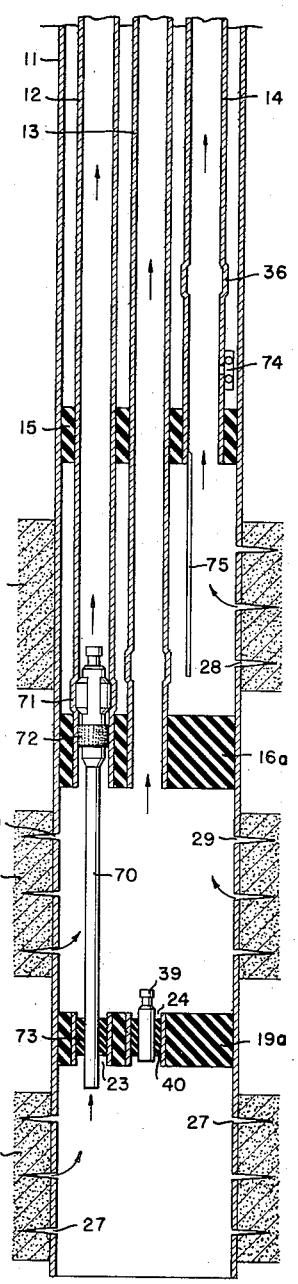
FIG. 7 is a further modification of the embodiment of FIG. 1 illustrating another tubing arrangement with one of the three tubing strings arranged above the three zones for simultaneous and separate production from the three zones.

In the embodiment of FIG. 7 it is possible to produce from zone 20 through the tubular conduit 70 and the tubing 12, from zone 18 through the tubing 13 and from zone 17 through the tubing 14.

Figure 8:
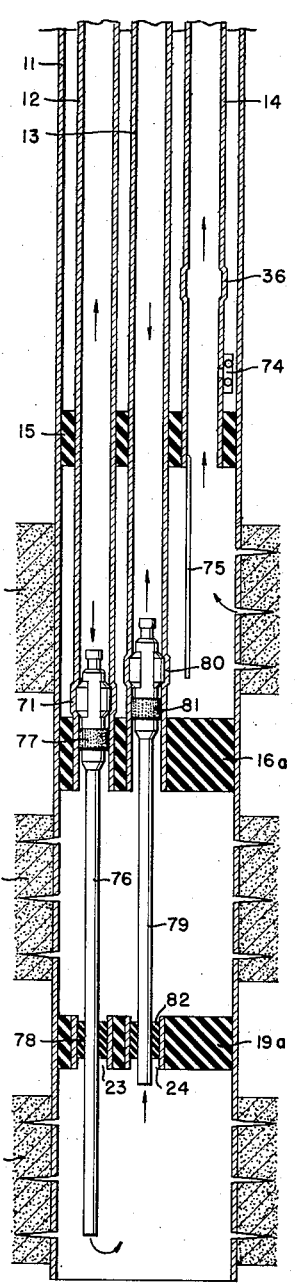
FIG. 8 is an illustration of workover and servicing the lower zone employing the embodiment of the tubings of FIG. 7.

Referring now to FIG. 8, a mode of operation and apparatus therefor will be described with respect to performing a workover operation in the zone 20. This may be achieved suitably by employing tubular extension members or conduits in each of the tubing strings 12 and 13 as will be described. To this end a tubular extension member 76 is positioned on the supporting means 71 and is sealed therein with sealing means 77 with its upper end and sealed in the bore 23 with sealing means 78 to close the bore. It is to be noted that tubular extension member 76 is of sufficient length to project into the zone 20. A tubular conduit 78 is positioned in the tubing 13 on a supporting means such as landing nipple 80 and sealed therein with sealing means 81 and sealed in the bore 24 with a sealing means 82 to close the bore 24. Thereafter, fluid may be flowed down the tubing 13 through the tubular conduit 79 and up the tubular conduit 76 and the tubing 12. It is to be noted by the arrows proceeding in either direction that fluid may be flowed down the tubing 12 and tubular conduit 76 and up the tubular conduit 79 and tubing 13.

In this mode of operation production may be continued from the zone 17 as may be desired up the tubing 14.

If desired, the tubular conduit 70 of FIG. 7 may be left in place, the plug 39 removed, and a tubular conduit installed in tubing 13 to seal as shown in FIG. 8 and to extend into zone 20. This embodiment and mode eliminates retrieval of tubular conduit 70 for workover of zone 20 and presents another mode of operation for workover.

Figure 9:
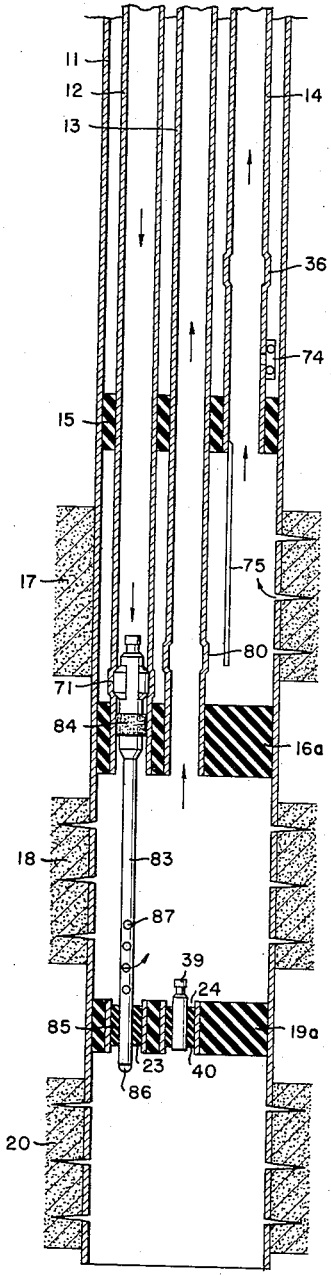
FIG. 9 is an illustration of workover and servicing the intermediate zone employing the embodiment of the tubings of FIG. 7.
Figure 10:
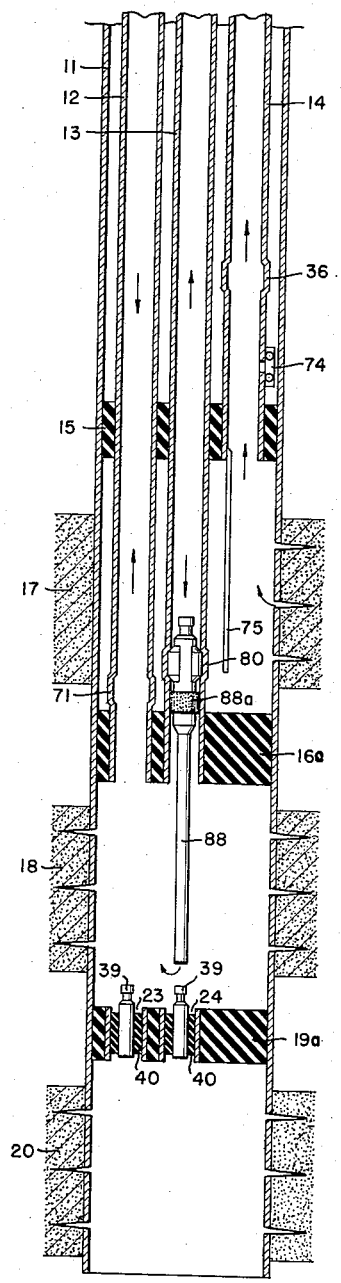
FIG. 10 is a modification of the embodiment of FIG. 9 illustrating workover and servicing of the intermediate zone.
Figure 11:
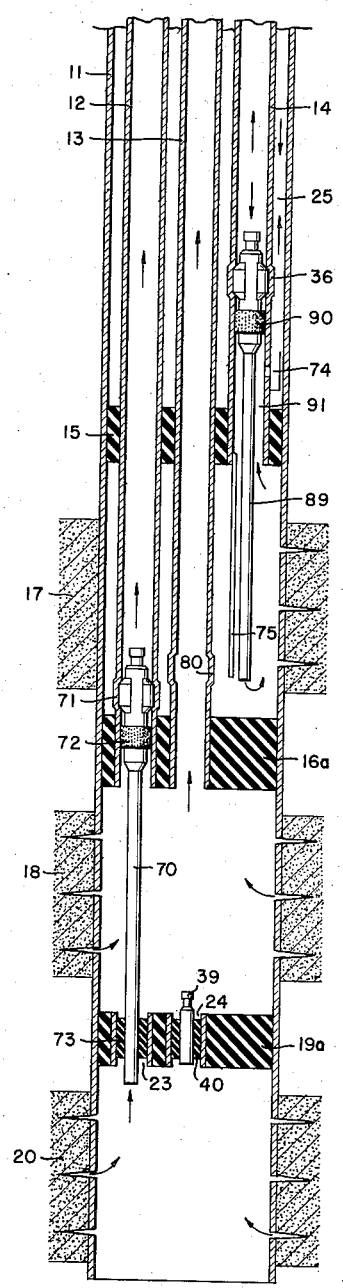
FIG. 11 is an illustration of workover and servicing of the upper zone employing the embodiment of the tubings of FIG. 7.

Referring now to FIGS. 9 to 11, inclusive, operations and apparatus are described where the several zones may have an operation other than production conducted therein. To this end, referring to FIG. 9, zone 18 is to be worked over and the bore 24 of the packer 19a may suitably be sealed with the wire line retrievable plug 39 provided with sealing means 40 and a tubular conduit such as 83 may be lowered through the tubing 12 and supported on the supporting means 71 and sealed therein with sealing means 84 and having its lower end sealed in the bore 23 with a sealing means 85. It is to be noted that the tubular conduit 83 has a closed lower end 86 and is provided with ports 87 intermediate its ends for fluid circulation.

With the zone 20 shut off with sealing means 85 and 40 and with the closed end 86, it is now possible to perform an operation in the zone 18 such as washing, treating, cementing, and the like. To this end fluid may be flowed down the tubing 12 and tubular conduit 83 out the ports 87 and up the tubing string 13 while simultaneously producing fluid from zone 17 upwardly through the tubing string 14.

In another mode of working over the zone 18, referring to FIG. 10, the bores 23 and 24 may suitably be closed off by using wire line retrievable plugs 39 provided with sealing means 40 which will effectively close off communication with the zone 20. A tubular conduit such as 88 is then lowered through the tubing 13 and positioned on the supporting means 80 and sealed therein with the sealing means 88a. It is to be noted that the tubular conduit 88 terminates with its lower open end above the packer 19a. Fluid such as has been described is then flowed down or up the tubing 12 and down or up the tubing 13, flowing through the tubular conduit 88 in either direction. Meanwhile, as has been described with the other embodiments, production may be continued from the zone 17 up the tubing 14.

Workover of zone 18 may also be accomplished with respect to FIGS. 9 and 10 by use of two tubular conduits which have sealing means on their lower ends to avoid the use of sealing plugs such as 39.

When it is desired to work over the zone 17 and to provide for production from the zones 18 and 20, as shown in FIG. 11, the tubular conduit 70 may be again seated on the supporting means 71 and sealed therein with sealing means 72 and likewise sealed in the bore 23 with sealing means 73. A tubular conduit 89 is lowered through the tubing string 14 and positioned on the supporting means 36 and sealed therein with its upper end with a sealing means 90. Prior to lowering the tubular conduit 89, the wire line valve 74 is opened to provide for reworking in the zone 17, fluid flow into the zone 17 being either from the annulus 25 through the valve 74 and down the annulus 91 between the tubular conduit 89 and the bore of tubing 14 and up the tubular conduit 89 in tubing string 14 or down the tubing string 14 and the tubular conduit 89 up the annulus 91 and through the valve 74 into annulus 25. Meanwhile, production may be continued from zone 20 through the tubular conduit 70 and tubing 12 and from zone 18 through tubing 13 as has been described. The bore 24 of packer 19a is closed with wire line retrievable plug 39 and sealing means 40.

Referring now to FIGS. 12 to 17, inclusive, a different mode and apparatus for practicing the present invention will be described. In this mode and apparatus the packer 16 is replaced by packing means 95, which is provided with dual bores 96 and 97 and having a lateral passageway 98 communicating the bores. The packer 19 is replaced by a packer 99 having a single bore 100. It is to be noted that the tubular conduit 70 is positioned on a supporting means 71 and sealed therein with sealing means 72 and is sealed by sealing means 73 with the bore 100. A tubular conduit 101 is supported on the support-means 102 above the packing means 15 and is sealed therein with sealing means 103. The tubular conduit 101 is also sealed in the bore 97 of packer 95 by sealing means 104. By this arrangement of apparatus, it is then possible to produce from zone 17 through tubing string 14, from zone 18 through tubular conduit 101 and tubing string 13, and from zone 20 through tubular conduit 70 and tubing string 12.

When it is desired to work over the zone 20, the tubular conduit 70 is replaced by tubular conduit 105 comprised of concentrically arranged and spaced apart pipes 106 and 107, pipes 106 and 107 being spacingly attached to each other by means 105a and 105b, the pipe 106 being sealingly positioned on the supporting means 71 and sealed therein with sealing means 108, while the pipe 107 is sealed in the bore 96 with a sealing means 109 below the lateral passageway 98. Likewise, the concentric pipe 107 is sealed in the bore 100 with a sealing means 109a to close the bore 100 and to provide circulation as has been described.

In this particular embodiment a tubular conduit 110 replaces the tubular conduit 101 and is supported in tubing string 13 on supporting means 102 and sealed therein with sealing means 111 on its upper end. Also, the tubular conduit 101 is provided with a port 112 which communicates with the passageway 98, the bore 97 being closed with a sealing means 113 above the port 112 and with a sealing means 114 below the port 112.

With this assemblage of apparatus, it is now possible to continue production from zone 17 up the tubing string 14 and to flow fluid down into the zone 20 either upwardly or downwardly through tubing strings 12 and 13. For purposes of example only, flow is described down the tubing string 12 through the concentric pipe 106 outwardly therefrom into zone 20 and up through the annular passageway 115 between the pipes 106 and 107 and thence into the lateral passageway 98 through the port 112 and into the tubular conduit 110 and upwardly to the earth's surface through the tubing string 13. It is to be understood, of course, that the flow may be reversed in either direction. It is to be further noted that the production from zone 18 has been interrupted by the closed lower end 116 of the tubular conduit 110.

When it is desired to perform an operation in the zone 18, a tubular conduit 117 is provided in the tubing string 12 supported on the supporting means 71 and sealed therein with sealing means 118, the tubular conduit 117 having a closed lower end 119 and being provided with ports 120 intermediate its ends and with a sealing means 121 engaging in the bore 100 of the packer 99. By virtue of the mode and embodiment of FIG. 14, it is possible to circulate fluid downwardly or upwardly in tubing strings 12 and 13 and to circulate fluid into the zone 18 through the ports 120. Fluid flows, for purposes of example only, down the tubing string 12 and the tubular conduit 117 out the ports 120 and up the tubular conduit 110 and the tubing string 13. Again, it is to be noted that production may be continued from the zone 17 up the tubing string 14.

When it is desired to work over the intermediate zone 18 in the embodiment of FIG. 15, a wire line retrievable plug such as 39 with sealing means 40 is placed in the bore 100 to shut off communication from the zone 20. Thereafter a retrievable tubular conduit 122 is positioned on the supporting means 102 and sealed therein with sealing means 123 and is also sealed in the bore 97 with sealing means 124. Flow may then be had downwardly or upwardly tubing strings 12 and 13 and through the tubular conduit 122. For purposes of illustration only, flow may be had down the tubing string 13 and tubular conduit 122 and up the tubing string 12 to the earth's surface. Like the other embodiments of this series of figures, production of hydrocarbons may be continued from zone 17.

Referring now to FIG. 16, it is desired to work over zone 17 and to this end tubular conduit 117, such as used in FIG. 14, is lowered through the tubing string 13 and positioned on the supporting means 102 and sealed therein with sealing means 118, the ports 120 allowing communication into the zone 17.

The sealing means 121 closes the bore 97 of the packer 95. Thus, fluid may be flowed upwardly or downwardly through the tubing strings 13 and 14, and for purposes of illustration, flow may be described down the tubing string 13 through the tubular conduit 117 and out the ports 120 in view of the closed lower end 119 and thence up the tubing string 14.

Retrievable tubular conduit 70 may be left in place and production from zone 20 may be had upwardly through the tubing string 12 while working over the zone 17. If desired, however, the bore 100 of the packer 99 may be closed with wire line retrievable plug 39 and sealing means 40 to prevent flow from zone 20 and to allow flow from zone 18 as may be desired.

As an alternative to the embodiment of FIG. 16, apparatus is provided in FIG. 17 which allows production to be had from zone 20 or from the zone 18, while working over the zone 17 as described with respect to FIG. 16. To achieve this end, a tubular conduit 125, which is similar to other tubular conduits, is lowered through the tubing 14 and supported on the supporting means 126 which may be similar to supporting means 36 and sealed with sealing means 127, the bore 97 having been closed with the wire line retrievable plug such as 39 provided with sealing means 40. A wire line operated valve (not shown) may be provided below sealing means 127 providing communication with the casing-tubing annulus for workover of zone 17. Flow is downwardly or upwardly through the tubing strings 13 and 14 into the region 17. For purposes of illustration, flow down the tubing string 14 and through the tubular conduit 125 is described and then upwardly through the tubing 13. By leaving tubular conduits such as 70 and 101, shown in FIG. 12, in place, production may be had from the zones 18 and 20 or flow only from zone 18 may be obtained by placing a wire line plug 39 with sealing means 40 in the bore 100, or if desired a tubular conduit may be placed in the tubing string 12 and sealed therein and then sealed in the bore 100 to allow flow from the zone 20 and to terminate flow from the zone 18.

Referring again to FIG. 12, flow of production fluids may take alternate paths with this embodiment. Thus, production fluids may proceed upwardly through tubular conduit 101 or through passageway 98 and thence into tubular conduit 101 by providing a port in tubular conduit 101 adjacent passageway 98, such as shown at 112 in FIG. 13, and by providing a seal 101a to close the bore 97. Seal 101a may be similar to seal 114 of FIG. 13.

Similarly, fluids may flow in these alternate and several paths using the embodiments of FIGS. 14 and 15.

While the guide means 75 shown in FIGS. 12 to 17, inclusive, may be employed, other guide means may be used in lieu thereof. For example, guide means suitable to orient a perforator may be provided interiorly of a tubing string rather than dependent therefrom with the perforator attached to suitable means which will position and orient the perforator below the lower end of the tubing string. Also, the tubular conduit or the tubing extending through a zone to be perforated may serve as guide means to position the perforator and orient same such that it will perforate only the casing. A method for orienting a perforator is disclosed and claimed in Serial No. 618,937, filed October 29, 1956, for Walter J. Bielstein.

It is to be noted that, while the several packers are shown with the passages therethrough in vertical alignment, the passages through the several packers 15, 16, 16a, 19, 19a, 45, and 99 do not necessarily lie along a single vertical axis such that the passages are vertically aligned. Actually, the tubular conduit such as 30 is of sufficient flexibility that its lower end is stabbed into one of the bores of the packer such as 16 and 16a and when a second tubular conduit 43 is lowered into position it necessarily must be and is inserted into the bore of the packer such as 16 or 16a not occupied by the other conduit 30. The same holds true for the lower packer such as 19 or 19a. For the successful practice of the present invention, it is immaterial which of the bores is occupied by the tubular conduits so long as the several zones are isolated from each other.

A similar situation also exists for the plug 39. Plug 39 will be used to close off the bore of the particular packer which is not closed off by the other means such as one of the tubular conduits.

The several showings in the drawings of the various elements of the several embodiments are schematic. Thus, while the casing 11 and tubing strings 12, 13, and 14 are shown without the conventional pipe connections, it is to be understood that the casing 11, and tubing strings 12, 13, and 14 are made up of the usual sections which are interconnected by the usual pipe connections such as threaded joints, connections, and the like. The valved ports 42 and 74 are also shown schematically and are of a type available to the art. A valve of the type shown in the drawings is described in the Composite Catalog of Oil Field and Pipe Line Equipment, page 1905 of the 21st edition and at page 1130 of the Composite Catalog of Oil Field Equipment and Services, 22nd edition. The operation of such valves is also described in the references to the two Composite Catalogs supra.

The plug such as 39 is also shown schematically since it is of a type described at pages 4007 and 4213 of the 21st edition of the Composite Catalog supra.

The packer 15 may suitably be one such as known to the art as the Brown Packer described at page 849 of the 21st edition of the Composite Catalog supra modified to accommodate three tubing strings. Packers 16, 16a, and 19a may be suitably packers such as the Brown Dual Packer described at page 849 of the Composite Catalog, 21st edition supra. Packer 95 may be of the type well-known in the art modified to provide a laterally extending passageway. A packer with such a passageway is shown in the patent to Tausch 2,822,048. Packer 99 may be one such as known as the Baker Retainer Production Packer described at page 539 of the 21st edition of the Composite Catalog supra. Also, packer 25 may be a packer similar to that described in the Lebourg Patent 2,847,072.

It will be seen from the description taken with the several figures of the drawing that a new improved apparatus and mode of operation have been described which will allow separate and simultaneous production of fluid from three vertically spaced apart hydrocarbon productive zones. Also, with the arrangement of apparatus, it is possible to work over each of the several zones without manipulating the tubing strings and by lowering tubular conduits through the several tubing strings. Thus, the several tubing strings are permanently arranged in the well. The present invention is therefore quite advantageous and useful and it is very economical to operate and allows production and workover of several zones in a single well.

The nature and objects of the present invention having been completely described and illustrated, what we wish to claim as new and useful and to secure by Letters Patent is:

1. Apparatus for completing a well having a casing arranged therein and penetrating a plurality of hydrocarbon zones which comprises, in combination, three substantially parallel eccentrically and permanently arranged tubing strings in said casing, one of said tubing strings having its lower end arranged above and intermediate of, but below the upper of the plurality of hydrocarbon productive zones and the other of said tubing strings having their lower ends arranged above the upper of said zones, a first packing means arranged on said tubing strings above an upper of said zones, said first packing means having triple parallel bores, a second packing means spaced vertically below said first packing means and arranged in said casing between the upper and the intermediate of said zones, an open bore third packing means spaced vertically below said second packing means and arranged in said casing below the intermediate zone, said second packing means being provided with two parallel bores and having a lateral passageway fluidly communicating the bores thereof, said one tubing string extending through one of the bores of the first packing means and terminating in one of the bores of said second packing means and said other tubing strings terminating in the bores of said first packing means other than the bore through which said one tubing string extends, a tubular conduit retrievably positioned in the lower end of a selected of said tubing strings with its upper end on a supporting means in the lower end of said selected tubing string and of sufficient length to extend at least into the space between two of said packing means, means carried by said tubular conduit for sealing between the inner wall of said selected tubing string and said tubular conduit, and means separate from any of said pipe strings engaging in a bore of the second packing means, other than the bore in which said one tubing string terminates, provided with sealing means.

2. Apparatus in accordance with claim 1 in which the tubular conduit is retrievably positioned in said one of said tubing strings and extends at least into the bore of said third packing means and the engaging means is a second tubular conduit retrievably positioned in one of the other tubing strings having their lower ends arranged above the upper of said zones.

3. Apparatus in accordance with claim 2 in which the first mentioned tubular conduit has a port fluidly communicating with the lateral passageway and the second tubular conduit has a closed lower end and a port fluidly communicating with the lateral passageway.

4. Apparatus in accordance with claim 3 in which the lower end of the first tubular conduit is closed and said first tubular conduit is provided with at least one port opening into the space between the second and third packing means.

5. Apparatus in accordance with claim 1 in which the tubular conduit is retrievably positioned in the lower end of one of the other of said pipe strings having their lower ends arranged above the upper of said zones and is of sufficient length to extend at least into the bore of said second packing means other than the bore in which said one tubing string terminates.

6. Apparatus in accordance with claim 5 in which the tubular conduit has a closed lower end and is provided with at least one port opening into the space between the first and second packing means.

7. Apparatus in accordance with claim 1 in which one of the other of said tubing strings has depending from the lower end thereof and projecting into the space between the first and second packing means a guide means for orienting a perforator for perforating only said casing in said upper zone in a direction removed from any of said tubing stings.

References Cited in the file of this patent

UNITED STATES PATENTS

| | | |
|---|---|---|
| 1,861,332 | Waitz | May 31, 1932 |
| 2,785,754 | True | Mar. 19, 1957 |
| 2,822,048 | Tausch | Feb. 4, 1958 |
| 2,846,876 | Willingham | Aug. 12, 1958 |
| 2,847,072 | Lebourg | Aug. 12, 1958 |
| 2,850,099 | Brown | Sept. 2, 1958 |
| 2,903,066 | Brown | Sept. 8, 1959 |
| 2,906,345 | Tausch et al. | Sept. 29, 1959 |
| 2,950,761 | Brown et al. | Aug. 30, 1960 |